Dec. 18, 1956 B. L. HAVENS 2,774,868

BINARY-DECADE COUNTER

Filed Dec. 21, 1951 3 Sheets-Sheet 1

INVENTOR.
BYRON L. HAVENS
BY Dwight D. Mooney
ATTORNEY

INVENTOR
BYRON L. HAVENS
BY Dwight D. Mooney
ATTORNEY

Dec. 18, 1956 B. L. HAVENS 2,774,868

BINARY-DECADE COUNTER

Filed Dec. 21, 1951 3 Sheets-Sheet 3

INVENTOR
BYRON L. HAVENS

BY Dwight D. Mooney
ATTORNEY 2,774,868
Patented Dec. 18, 1956

2,774,868

BINARY-DECADE COUNTER

Byron L. Havens, Closter, N. J., assignor to International Business Machines Corporation, New York, N. Y., a corporation of New York Application December 21, 1951, Serial No. 262,734

14 Claims. (Cl. 250—27)

This invention relates to counters and more particularly to high speed electronic counters.

In a conventional chain type electronic counter the counting elements are connected in series chain so that the switching of one element causes a switching of the next higher element in the chain. The inherent delay in the switching of each element or stage is therefore transferred to the next stage and the cumulative delay results in delayed switching of the higher stages of the chain with respect to that of the lower stages. In other words, the first stage of the chain is switched with a delay determined by its own characteristics per se while the delay of switching of subsequent stages is determined by their own characteristics and by the cumulative delay in the switching of all prior stages of the chain. If such conventional counting chains are used in coincidence timing circuits where the time of pulse occurrence is a predominating factor to successful operation ambiguous operation results. Such failure is directly attributable to the cumulative delay in the switching of the stages and the resulting pulse coincidence.

Accordingly, a principal object of this invention is to provide a novel counting chain which completely eliminates the above-mentioned objectionable features.

Another object of the invention is to provide a novel binary to decade counter wherein the conversion from binary to decade counting is made possible solely by the selective conditioning of the counting elements employed.

Another object is to provide a counting chain including a plurality of switching circuits or stages wherein pulses to be counted are applied simultaneously to each stage of the chain so that the delay in the switching of any stage is independent of the delay in the switching of all others.

Another object is to provide a counting chain including a plurality of stages wherein each stage is automatically switchable in a certain preselected time interval and has a pulse applied to it during this interval to effect a switching thereof in response thereto before the automatic switching can take place.

A further object is to provide a counting chain having a plurality of counting elements including means for simultaneously applying pulses to be counted to each of said elements and circuit means for rendering each of said elements operative in response to a preselected one of said pulses irrespective of the effect of said pulse on any other element.

Other objects of the invention will be pointed out in the following description and claims and illustrated in the accompanying drawings, which disclose, by way of example, the principle of the invention and the best mode, which has been contemplated, of applying that principle. Other embodiments of the invention employing the same or equivalent principle may be used and structural changes made as desired by those skilled in the art without departing from the present invention and within the spirit of the appended claims.

In the drawings:

Fig. 1 is a circuit diagram of a trigger circuit, including keying means therefor, which may be utilized by the invention.

Fig. 1*a* is a blocked diagram illustrating the trigger circuit shown in Fig. 1.

Briefly, the invention provides a novel electronic counter employing a plurality of switching circuits or stages wherein the delay in the switching of any stage is completely ineffective to effect a delay in the switching of any other switching circuit. Each stage is switched in response to the conduction of a keying tube associated therewith. Pulses to be counted are applied simultaneously to each keying tube. Each keying tube, except one, is conditioned in a novel manner, to be conductive in response to the application thereto of pulses to be counted. For the keying tube associated with a given stage to be conditioned so that it may be responsive to the next subsequent pulse to be counted it is necessary that each lower stage be in one preselected condition. This is accomplished by serially connecting a plurality of "and" circuits between selected stages so that the effective operation of each is dependent upon the operation of the prior ones of the series.

In another embodiment a binary counter is converted to decade operation solely by the selective conditioning of the stages of the counter. This selective conditioning is accomplished in a novel manner by the interconnection of the stages through a plurality of "and" circuits and a single "or" circuit.

Figures 1, 1A:
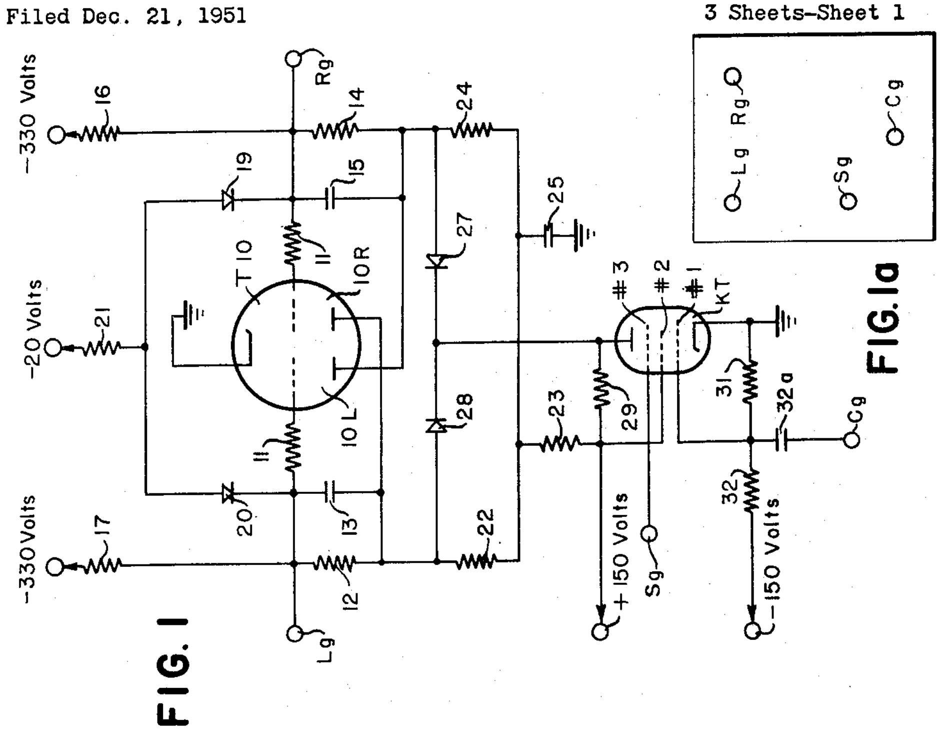

Referring to Fig. 1 the trigger and keying circuit comprise the two triode trigger tubes shown in the single envelope T10, the left and right tube sections being designated by 10L or 10R respectively, and the keying tube by KT.

The grid of each of the tubes 10L and 10R has a parasitic suppressor resistor 11 connected thereto. The grid of the tube 10L is also connected through a resistor 12 and a capacitor 13 in parallel therewith to the plate of the tube 10R and the grid of the tube 10R is connected through a like resistor 14 and a like capacitor 15 in parallel therewith to the plate of the tube 10L. The grid of the tube 10R is also connected through resistor 16 to a source of suitable negative voltage, say −330 volts, the grid of the tube 10L is connected through a like resistor 17 to the same voltage source. These control grids are also connected through a resistor 21 to a suitable source of negative voltage, say −20 volts. The plate of the tube 10R is connected through resistors 22 and 23 to a suitable source of plate supply voltage, say +150 volts and the plate of the tube 10L is similarly connected through resistors 24 and 23. The juncture of resistors 22 and 24 is connected through capacitor 25 to ground to provide decoupling from circuits external to the trigger circuit.

The plates of the tubes 10L and 10R are also connected together through the rectifiers 27 and 28 respectively and the juncture connected directly to the plate of the keying tube KT. The plate of the tube KT is also connected through load resistor 29 to the source of positive plate supply voltage to which the grid #2 of tube KT is also connected. The cathode of tube KT is connected directly to ground as is the common cathode of tube T10. The grid bias resistor 31 is connected to ground and through grid bias resistor 32 to a source of negative voltage, say −150 volts. The grid #1 of tube KT is connected directly to the juncture of resistors 31 and 32. The grid #3 (suppressor grid) of the tube KT is connected to a terminal S*g* and grid #1 (control grid) is connected to a terminal C*g* through condenser **32*a***. The terminals S*g* and C*g* are provided to receive positive voltages so that the keying tube KT may be rendered conductive at preselected times when such positive voltages are simultaneously applied to the two terminals. The terminals L*g* and R*g* connected to the control grids of tubes 10L and 10R respectively are provided to convey outputs from those respective tubes.

In operation the trigger circuit associated with the tube T10 performs in a manner very similar to that of a conventional Eccles-Jordan trigger circuit in that the trigger circuit alternately assumes each of two stable conditions in response to the plate current conduction of the keying tube KT. When in one of these stable conditions the tube 10L is conductive and the tube 10R is non-conductive. This condition is referred to herein as the Left condition. When in the other stable condition the tube 10L is non-conductive and the tube 10R is conductive. This condition is referred to herein as the Right condition. The trigger circuit may be initially placed in one chosen stable condition by any conventional means such as, temporarily applying a different grid bias to the two tubes 10R and 10L. Assuming that the trigger circuit is in the Left condition, the voltage at the plate of the conductive tube 10L is low, the voltage of the non-conductive tube 10R is high, the voltage at the terminal L*g* is high, and the voltage at the terminal R*g* is low.

When suitable positive pulses are simultaneously applied to the terminals C*g* and S*g* of the keying tube KT that tube is rendered plate current conductive and accordingly produces a voltage drop at the juncture of rectifiers 27 and 28. Obviously, since the trigger circuit is in the Left condition the inverse voltage drop across the rectifier 28 prior to conduction of the tube KT is less than that across the rectifier 27. Hence, conduction results through the rectifier 28 to lower the voltage at the grid of the tube 10L. As a result conduction through tube 10L is decreased and the corresponding voltage increase at its plate is transferred through resistor 14 and capacitor 15 in parallel therewith to the control grid of the tube 10R to render it conductive. The corresponding voltage decrease at the plate of tube 10R is transferred through resistor 12 and capacitor 13 in parallel to the control grid of the tube 10L to render it still less conductive. This cumulative action is continued until the tube 10L is rendered non-conductive and the tube 10R is rendered fully conductive to place the trigger circuit in the Right condition.

Since, the rectifier 27 is connected between the plate of the tube 10L and the plate of the tube KT and since both these plates are at relatively low voltages when the trigger circuit is keyed from the Left condition the decreased keying voltage applied to the grid of the tube 10L is not applied to the tube 10R. Hence, the voltage drop at the juncture of rectifiers 27 and 28 is routed to the grid of the conductive trigger tube and is not applied to the grid of the non-conductive trigger tube. The rectifiers 27 and 28 also prevent the voltage at the plate of the keying tube KT from decreasing below the voltage at the plate of the corresponding tubes 10L and 10R respectively. Such is the case because when the voltage at the plate of the tube KT tends to become less than that at the plate of either of the tubes 10L or 10R current is passed therethrough tending to equalize the voltage difference between the respective plates. This selective application of pulses from a common source to the grids of the tubes 10L and 10R permits a more positive switching of the trigger circuit than is realized when each pulse from the common source is applied to both tubes.

The rectifiers 19 and 20 are provided to limit the voltage excursion at the control grid to which each is connected to −20 volts which is the value of the voltage commonly applied to the other terminal of the rectifiers. This limiting of the voltage excursion decreases the recovery time of the trigger circuit and therefore permits a faster switching thereof.

It is now clear that each simultaneous application of suitable positive pulses to the terminals S*g* and C*g* connected to the keying tube KT causes an output pulse to appear at each of the terminals L*g* and R*g*. When the trigger circuit is switched to the Right condition the output pulse at the terminal L*g* is negative and that at the terminal R*g* is positive and when the trigger circuit is switched to the Left condition the polarity of these respective output pulses is reversed.

In Fig. 1*a* the block diagram represents the entire circuit above described. The terminals L*g*, R*g*, S*g* and C*g* are shown in the block diagram so that the connection in this circuit arrangement with other circuits may be clearly understood at sight.

Figure 2:
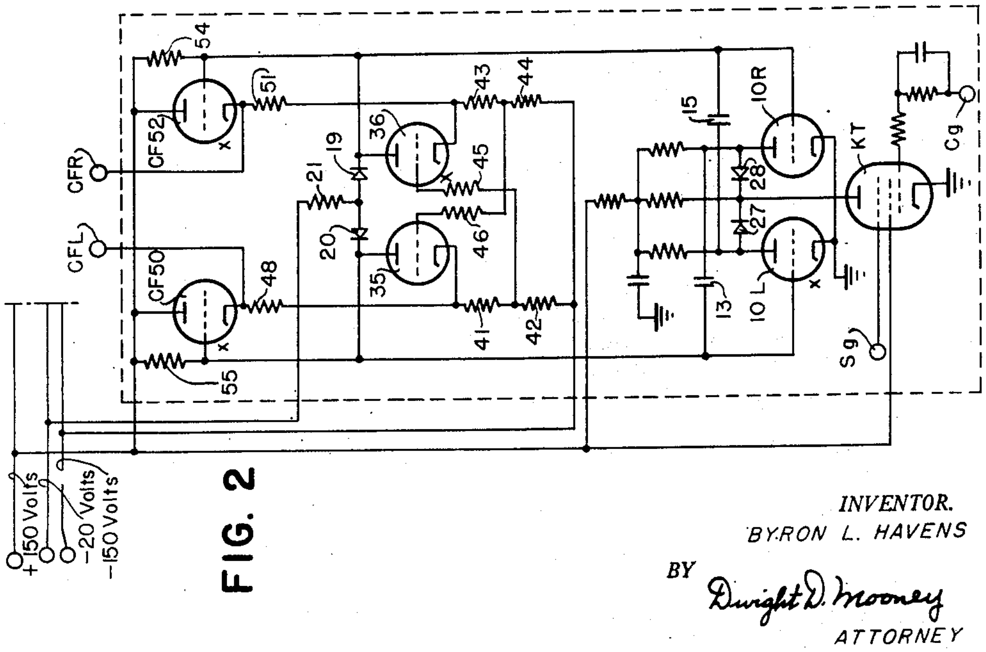
Fig. 2 is a circuit diagram of a trigger circuit employing a multivibrator which may be utilized by the invention.

Referring to Fig. 2 the trigger circuit includes a keying tube KT which functions as the keying tube KT shown in Fig. 1. The tubes 10L and 10R are connected to function as a multivibrator. The multivibrator circuit is similar to the trigger circuit of Fig. 1 except that the resistive connection between the plate of each tube and the control grid of the other is omitted. This is a conventional change to effect conversion of a trigger circuit to a multivibrator circuit.

The trigger circuit of Fig. 2 retains the desirable features of a multivibrator in that there is no resistive coupling between the plate of each trigger tube and the control grid of the other. The frequently objectionable feature of a multivibrator as an electronic switch, namely, that it is free running and cannot be switched from one stable condition to the other, is overcome by the use of clamping tubes 35 and 36.

The plate of each of the tubes 35 and 36 is connected through the respective rectifiers 20 and 19 and the resistor 21 to a suitable source of negative supply voltage, say −20 volts. The cathode of the tube 35 is connected to a suitable source of negative voltage, say −150 volts, through the resistors 41 and 42 and the cathode of tube 36 is similarly connected through the resistors 43 and 44. The control grid of tube 35 is connected through a resistor 46 to the junction of resistors 43 and 44 and the control grid of tube 36 is connected through a resistor 45 to the juncture of resistors 41 and 42.

The cathode of tube 35 is also connected through a resistor 48 to the cathode of cathode follower tube CF50 and the cathode of tube 36 is connected through a resistor 51 to the cathode of cathode follower tube CF52. The plates of the tubes CF50 and CF52 are connected directly to the +150 volt supply. The grid of the tube 10R, the plate of the tube 36, and the grid of the tube CF52 are commonly connected through a resistor 54 to a suitable source of positive supply voltage, for example, +150 volts. The grid of the tube 10L, the plate of tube 35, and the grid of tube CF50 are commonly connected through a resistor 55 to the +150 volt supply. The cathodes of the tubes CF50 and CF52 are connected to output terminals CFL and CFR respectively.

The cathode follower tubes CF50 and CF52 are both always conductive regardless of the conductive condition of the tubes 10L, 10R, 35 and 36. The conductivity of tubes CF50 and CF52 is indicated by an X to the lower left of the respective tubes. When the multivibrator tube 10L is conductive the tube 35 is non-conductive and when the multivibrator tube 10R is conductive the tube 36 is non-conductive. The rectifiers 20 and 19 are connected between the −20 volt supply and the control grids of the tubes 10L and 10R tend to prevent those control grids from going below the −20 volts and therefore determine the most negative positions of the grids of the multivibrator tubes 10L and 10R. The rectifiers prevent those grids from reaching a voltage as negative as they would otherwise reach, it therefore takes less time and less power for a pulse to effect a switching of the multivibrator from one stable condition to the other than would be the case if the rectifiers were not employed.

In operation, the cathode follower tubes CF50 and CF52 are always conductive. For purposes of explanation, it is assumed that the tubes 10L and 36 are initially conductive, as indicated by the *x* to the lower left of the respective tubes, and the tubes 10R and 35 are initially non-conductive. When the keying tube KT is rendered plate current conductive, as previously described, a decreased voltage is applied to the commonly connected terminals of the rectifiers 27 and 28 and tends to cause conduction through a preselected one of the rectifiers as set forth previously herein. A negative pulse is transferred through the capacitor 13 to the control grid of the tube 10L. Conduction through the tube 10L is decreased and a positive voltage is transferred through capacitor 15, connected to its plate, to the control grid of the tube 10R to render it conductive.

The accumulative action above described then switches the multivibrator to the Right condition. This condition causes a positive voltage to be applied to the control grid of the cathode follower tube CF52 to render it more conductive and a negative voltage to be applied to the control grid of the cathode follower tube CF50 to render it less conductive. The resulting increased voltage at the cathode of tube CF52 is transferred to the terminal CFR and through voltage dividers to the cathode of clamping tube 36 and the control grid of clamping tube 35. The decreased voltage at the cathode of the tube CF50 is transferred to the terminal CFL and through voltage dividers to the grid of clamping tube 36 and the cathode of clamping tube 35.

The effect of this simultaneous application of these voltages to the tubes 35 and 36 is twofold. The application of these voltages to the grid and the cathode of the tube 36 sufficiently increases or raises the potential of the cathode relative to the grid to thereby render the tube 36 non-conductive. The application of these voltages to the control grid and cathode of the tube 35 renders tube 35 conductive. The resulting plate current of the tube 35 is applied to the control grid of the cathode follower tube CF50 and the control grid of the multivibrator tube 10L. This currnt counteracts the tendency of the current through resistor 55 to hold these grids at a voltage as near +150 volts as the grid current of multivibrator tube 10L will permit. The steady plate current drawn from the control grid circuit of the tube 10L by tube 35 when it is rendered non-conductive assures that the grid of 10L will remain below cut off and that the multivibrator will remain in the Right condition until the keying tube KT is again rendered conductive. Non-conduction of tube 36 permits the current through resistor 54 to tend to raise the voltage at the control grid of the tube 10R thereby insuring that the voltage on that control grid will remain sufficiently positive to cause conduction through the tube 10R until keying tube KT is again rendered conductive.

Subsequent plate current condition of the keying tube KT will in like manner cause a switching of the stable condition of the multivibrator from the Right condition to the Left condition, render clamping tube 35 non-conductive and clamping tube 36 conductive, decrease the conduction through cathode follower tube CF52, increase the conduction through cathode follower tube CF50 and provide increased and decreased voltages respectively at the terminals CFL and CFR. It is now clear that the clamping tubes 35 and 36 function to relieve the positive voltage locking action of the resistor 54 or 55 on the control grid of the non-conductive multivibrator tube and permit a locking of positive voltage at the control grid of the conductive multivibrator tube and effect a locking of negative voltage at the control grid of the non-conductive multivibrator tube between periods of conduction of keying tube KT.

The circuits of Figs. 1 and 2 are described and claimed in the Byron L. Havens Patent No. 2,745,955, granted May 15, 1956, on application Serial No. 262,733, filed December 21, 1951, of common assignee herewith, and entitled "Multivibrator Trigger Circuit."

Figure 3:
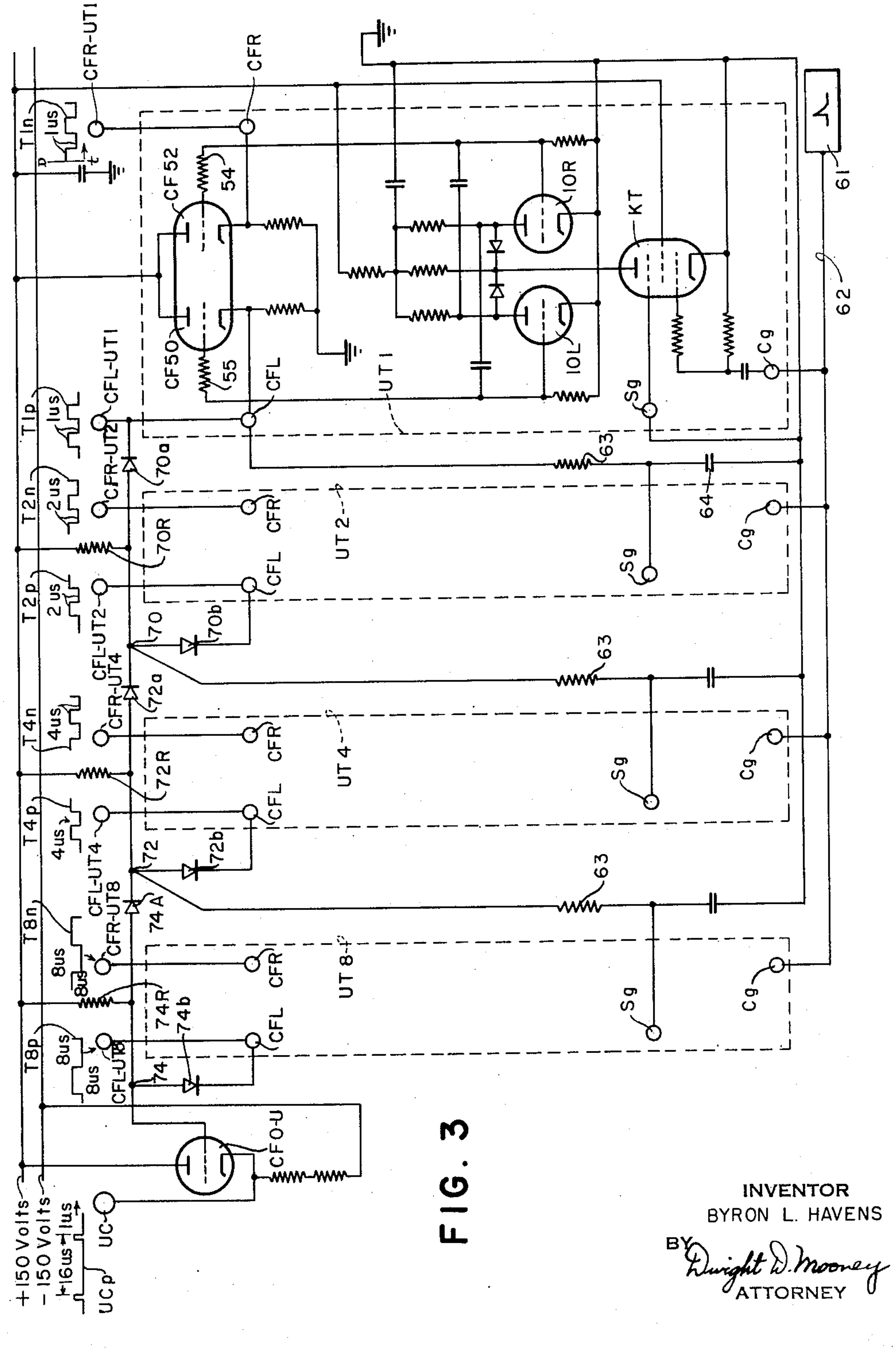
Fig. 3 is a circuit diagram showing one embodiment of the invention.

Referring more particularly to Fig. 3, the novel counter is supplied with pulses to be counted from a source 61 which will supply positive pulses at an interval of approximately 1 microsecond. The actual width of a suitable pulse may be approximatel 0.25 microsecond. These pulses may be supplied from any conventional pulse source, such does not constitute part of this invention. The counter shown in Fig. 3 includes four counting elements or stages UT1, UT2, UT4 and UT8 reading from right to left. These stages are of the free-running type and if a pulse to be counted is not applied before the natural period of response of any stage, they will assume another conductive condition automatically. The switching element or stage UT1 includes a keying tube KT, multivibrator tubes 10L and 10R, and cathode follower tubes CF50 and CF52. All of these tubes and the circuits associated therewith are similar to those shown in Fig. 2. It will be noted that the clamping tubes 35 and 36 of Fig. 2 and the clamping circuit associated therewith are omitted from the stage UT1. Also, the resistors 54 and 55 connected to the grids of the cathode follower tubes CF52 and CF50 respectively, are connected directly to the multivibrator tubes rather than to a source of positive voltage. It is obvious from the above connections that stage UT1 is therefore free-running and that the cathode follower tubes CF50 and CF52 merely serve as impedance devices. The terminals CFR and CFL of the cathode follower are connected to output terminals CFL—UT1 and CFR—UT1, respectively.

Because the stage UT1 does not assume two stable conditions but rather switches from one unstable conductive condition to another unstable conductive condition, it is referred to herein as a multivibrator. When the tube 10L is conductive the cathode follower tube CF50 is more conductive than cathode follower tube CF52. Hence, the voltage at the output terminal CFL—UT1 is more positive than that at the output terminal CFR—UT1. The multivibrators UT2, UT4 and UT8 are shown in block diagram form to afford ready understanding of the novel interconnections of the various elements to form a binary counter.

The source 61 is connected through a lead 62 to the terminal C*g* of each of the multivibrators so that pulses to be counted are applied to the control grid of the keying tube associated with each multivibrator. Hence, whether any multivibrator will be switched in response to a pulse to be counted is determined by the voltage on its suppressor grid (terminal S*g*) at that time. The terminal S*g* is connected directly to ground. Hence, each pulse from the source 61 will cause a switching of the multivibrator UT1 from the conductive condition it is in at that time to the other conductive condition. The terminal CFL of the multivibrator UT1 is connected through a delay network comprising resistor 63 and capacitor 64 to the terminal S*g* of multivibrator UT2.

It is seen that a slightly positive voltage will be applied to the terminal S*g* of multivibrator UT2 each time the multivibrator UT1 is in the left conductive condition, that is, when tube 10L is heavily conductive. Therefore, when a pulse to be counted switches the multivibrator UT1 to the left conductive condition a steady voltage is applied through the delay network comprising resistor 63 and capacitor 64 to the terminal S*g* of multivibrator UT2 so that the next pulse to be counted causes a switching of the multivibrator UT2 to its other conductive condition. The terminal CFL of multivibrator UT1 is connected through rectifiers 70*a* and 70*b* to the terminal CFL of the multivibrator UT2, a resistor 70R is connected between the juncture 70 of these two rectifiers and a +150 voltage supply. The rectifiers 70*a* and 70*b* and the resistor 70R comprise an "and" circuit. As used herein "and" circuit refers to a circuit which is operable only when all input terminals thereof have a positive voltage applied thereto simultaneously. Such usage is conventional.

Since the resistor 70R is connected to the +150 volt line it tends to pull the voltage at the juncture 70 to a value of 150 volts. However, the actual voltage at the juncture 70 can be no higher than the lower of the voltages at the two terminals CFL of the multivibrators UT1 and UT2 to which the other terminal of the rectifiers are connected. When the voltage at one of these terminals CFL rises, the voltage at the juncture 70 will change only if the increased voltage is present at the more negative of the two terminals. As stated, in such case the voltage at juncture 70 will rise until it reaches the increased voltage value. When the terminals CFL of both multivibrators UT1 and UT2 are at their most positive voltage value, i. e., UT1 and UT2 are each in the left conductive condition, the voltage at the juncture 70 will be sufficiently positive to condition the keying tube associated with the multivibrator UT4 and thereby permit a switching of the multivibrator UT4.

The rectifiers 72*a* and 72*b* and the resistor 72R are similarly connected to form an "and" circuit between the juncture 70 and the terminal CFL of the multivibrator UT4. It is seen that in order for a sufficiently positive voltage to be transferred from the juncture 72 to the terminal S*g* of the multivibrator UT8 to permit a switching thereof, it is necessary that terminal CFL of UT4 and the juncture 70 be at their most positive voltage value.

Similarly the rectifiers 74*a* and 74*b* and resistor 74R are connected to form an "and" circuit. It is seen that in order for the most positive voltage value to be present at the juncture 74 the terminal CFL of the multivibrator UT8 and the juncture 72 must be at their most positive value. When this condition obtains the cathode follower output tube CFO–U is rendered more conductive causing a slightly positive output voltage and when either of these two terminals is not at its most positive value tube CFO–U is rendered less conductive causing a negative output voltage. The cathode of the cathode follower output tube is connected to an output terminal UC.

It is seen from the above description of the operation of the "and" circuits, that the switching of any given stage in response to a pulse to be counted may be immediately determined if the conductive condition of the stages to the right of the given stage is known. To illustrate, consider the stage UT8 and assume that stages UT1, UT2, and UT4 are each in the left conductive condition and that stage UT8 is in the right conductive condition. A positive voltage is therefore present at the junctures 70 and 72 thereby applying a positive voltage to the terminal S*g* of stage UT8 to condition the keying tube thereof. The next pulse to be counted will therefore switch the stage UT8 to the left conductive condition.

Hence, if any stage to the right of a given stage is in the right conductive condition, then the given stage will not be switched in response to the next pulse to be counted. Conversely, if a given stage is to be switched by the next subsequent pulse to be counted, all stages to its right must be in the left conductive condition.

The operation of this novel counter will now be explained in connection with Fig. 3 and Chart I.

*Chart I*

| Multivibrators | | | | | | | | Pulses to be Counted |
|---|---|---|---|---|---|---|---|---|
| UT8 | | UT4 | | UT2 | | UT1 | | |
| | R | | R | | R | | R | 0 |
| | R | | R | | R | L | | 1 |
| | R | | R | L | | | R | 2 |
| | R | | R | L | | L | | 3 |
| | R | L | | | R | | R | 4 |
| | R | L | | | R | L | | 5 |
| | R | L | | L | | | R | 6 |
| | R | L | | L | | L | | 7 |
| L | | | R | | R | | R | 8 |
| L | | | R | | R | L | | 9 |
| L | | | R | L | | | R | 10 |
| L | | | R | L | | L | | 11 |
| L | | L | | | R | | R | 12 |
| L | | L | | | R | L | | 13 |
| L | | L | | L | | | R | 14 |
| L | | L | | L | | L | | 15 |
| | R | | R | | R | | R | 16 (0) |

In the chart "R" indicates that the particular multivibrator is in the right conductive condition and "L" indicates that the particular multivibrator is in the left conductive condition.

When voltage is applied to the +150 volt and the −150 volt lines each of the multivibrators UT1—UT8 will assume a conductive condition which will be determined by chance. For the sake of explanation only, it is assumed that each multivibrator assumes the right conductive condition. However, it is understood that the initial stable condition of the counter is immaterial since the cyclic performance of the counter is unchanged irrespective of its initial condition.

With all of the multivibrators in the right condition, the terminal CFL of each multivibrator has a negative voltage applied thereto and the cathode follower output tube CFO–U is negative.

With the multivibrator UT1 in the right conductive condition the terminal S*g* of UT2 is held at a negative voltage and the keying tube thereof is therefore de-conditioned. The fact that all the terminals CFL are negative means that the junctures 70, 72 and 74 are also negative and all the terminals S*g* are negative, except that of UT1.

The sixteenth input pulse applied from the source 61 to the terminals C*g* simultaneously switches all the multivibrators to the right conductive condition thereby completing one cycle of operation. Obviously, this positive pulse may be employed to condition suitable carry circuits connected to a similar higher order counter so that the sixteenth input pulse will switch this counter and effect carry simultaneously.

The first input pulse from the source 61 then switches multivibrator UT1 to the left conductive condition, causing the subsequent application of a positive voltage to the terminal S*g* of multivibrator UT2. The aforementioned pulse has no further effect on the counter.

The second input pulse, therefore, switches multivibrator UT1 to the right conductive condition and multivibrator UT2 to the left conductive condition simultaneously. All the terminals S*g*, except terminal S*g* of multivibrator UT1, are therefore de-conditioned.

The third input pulse switches the multivibrator UT1 to the left conductive condition. When the multivibrator UT1 switches to the left conductive condition, an increased voltage is transferred from the terminal CFL thereof to the terminal S*g* of the multivibrator UT2. This same voltage at the terminal CFL of the multivibrator UT1 in conjunction with the increased voltage present at the terminal CFL of the multivibrator UT2 render the "and" circuit comprising rectifiers 70*a* and 70*b* and resistor 70R operative, as previously described, to cause the voltage at the juncture 70 to become positive. This positive voltage is transferred from the juncture 70 to the terminal S*g* of the multivibrator UT4.

It follows that the fourth input pulse switches the multivibrators UT1 and UT2 to the right conductive condition and the multivibrator UT4 to the left conductive condition.

This operation is continued as indicated in Chart I until the fifteenth pulse to be counted causes the switching of the multivibrators UT1 and UT8 to the left condition. When multivibrator UT8 is switched to the left conductive condition in response to the fifteenth pulse the positive voltage appearing at the juncture 74 renders the cathode follower output tube CFO–U conductive so that a positive pulse appears at the output terminal UC. Obviously, this positive pulse may be employed to condition suitable carry circuits connected to a similar higher order counter, so that the sixteenth input pulse will switch this counter and effect carry simultaneously.

The sixteenth input pulse applied from the source 61 to the terminals Cg simultaneously switches all the multivibrators to the right conductive condition thereby completing one cycle of operation.

It is noted that the switching of each counting element or multivibrator in response to the pulses to be counted is simultaneous and that the utilization of "and" circuits comprising rectifiers to effect a preselected conditioning of the multivibrators is such that the additional load placed on the conditioning multivibrators is negligible. Obviously, such a novel arrangement provides for faster counter operation that is obtainable in a conventional chain type counter.

The output voltage at the terminal CFR—UT1 is represented by wave form T1*n* which comprises a series of one microsecond pulses. The output at the terminals CFR—UT2, CFR—UT4 and CFR—UT8 is represented by the respective wave forms T2*n*, T4*n* and T8*n*. These wave forms represent a series of two microsecond, four microsecond and eight microsecond pulses respectively. The wave forms at the terminals CFL—UT1, CFL—UT2, CFL—UT4 and CFL—UT8 are designated T1*p*, T2*p*, T4*p* and T8*p* respectively. These wave forms T1*p*, T2*p*, T4*p* and T8*p* are similar to the wave forms T1*n*, T2*n*, T4*n* and T8*n* respectively, except that they are 180 degrees out of phase with the latter. The voltage output wave form at the terminal UC is designated UC*p* and provides a positive pulse of 1 microsecond duration during each 16 microseconds.

It is clear from the foregoing that the trigger circuits of Figs. 1 and 2 may be used in the place of the multivibrator of Fig. 3 and the counter will operate as described above. If either of the trigger circuits is used correct counting will be effected even if the interval between the pulses from the source 61 exceeds 1 microsecond. Such a counter finds particular utility in a coincidence circuit where the interval between pulses applied to the counter exceeds the automatic switching time of the multivibrators or occur in any random manner.

Figure 4:
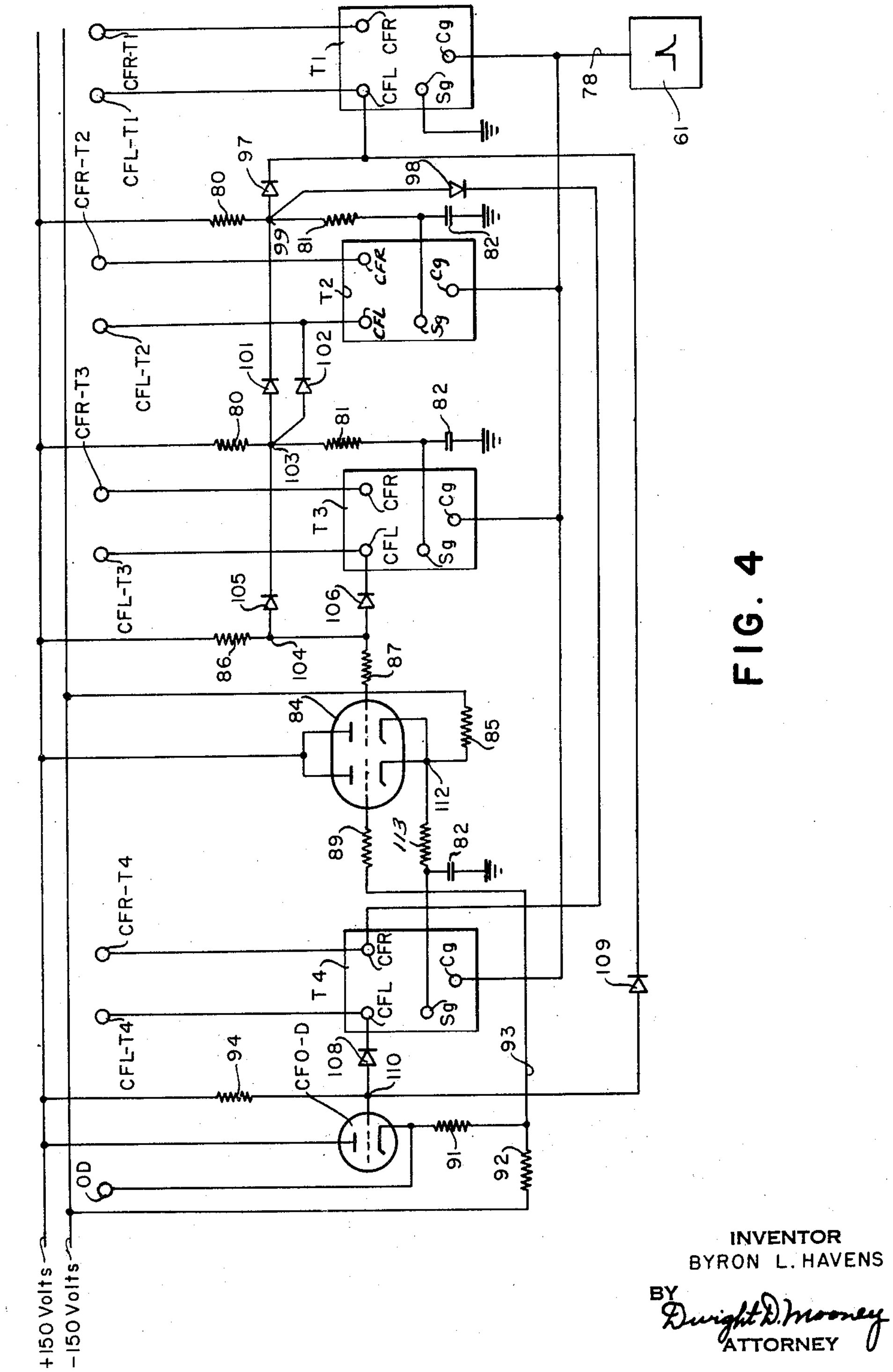
Fig. 4 is a circuit diagram showing another embodiment of the invention.

Referring to Fig. 4 the novel binary to decade counter includes four trigger circuits as shown in Fig. 2 and designated T1, T2, T3 and T4. Since each trigger circuit has a Left and Right stable condition, it is manifest that the counter operates equally well in response to timed or random pulses. These pulses are applied from a source 61 and transferred over lead 78 to the terminal Cg of each of the trigger circuits. It is assumed that the trigger circuits are all initially in the Right condition. Such may be obtained in any conventional manner such as by the temporary application of bias voltage to each trigger circuit.

It is seen that the trigger T1 whose terminal Sg is connected to ground will be switched in response to each pulse from the source 61. Each of the remaining trigger circuits, T2–T4 inclusive, will be switched from one stable condition to the other only when its terminal Sg has a positive voltage applied thereto. The application of this positive voltage and the conversation of the counter from binary to decade counting is accomplished by the novel employment of "and" circuits interconnecting the various trigger circuits. The "and" circuits selectively condition or bias the trigger circuits to effect conversion to decade counting in conjunction with the "or" circuit described hereinafter.

Resistors 80 and 81 are connected between the +150 volt line and the terminal Sg of each of the trigger circuits T2 and T3. Capacitor 82 is connected to the terminal Sg of each of the trigger circuits T2–T4 inclusive and with resistor 81 comprise a delay network. Tube 84 has its plate connected to the +150 volt line and its cathode connected to the —150 volt line through a resistor 85. The control grid of one section of the tube 84 is connected to the +150 volt line through the resistors 86 and 87 and the other control grid of the other section is connected through resistors 89 and 91 to the cathode of tube CFO–D. Tube 84 is therefore operated as a cathode follower "or" circuit.

A cathode follower output tube CFO–D has its plate connected directly to the +150 volt line and its cathode connected to the —150 volt line through the resistors 91 and 92. The cathode is also connected to an output terminal OD. The control grid of tube CFO–D is connected to the +150 volt line through a resistor 94.

The rectifiers 97 and 98 in conjunction with the resistor 80 connected to the juncture 99 thereof comprises an "and" circuit. The other terminal of the rectifier 97 is connected to the terminal CFL of trigger circuit T1 and the terminal of the rectifier 98 is connected to the terminal CFR of the trigger circuit T4. The rectifiers 101 and 102 and the resistor 80 connected to the juncture 103 thereof, comprise an "and" circuit. The other terminal of the rectifier 101 is connected to the juncture 99 and the other terminal of the rectifier 102 is connected to the terminal CFL of the trigger circuit T2. The rectifiers 105 and 106 and the resistor 86 connected to the juncture 104 thereof comprise an "and" circuit. The other terminal of the rectifier 105 is connected to the juncture 103 and the other terminal of the rectifier 106 is connected to the terminal CFL of the trigger circuit T3. The rectifiers 108 and 109 and the resistor 94 connected to the juncture 110 thereof comprise an "and" circuit. The other terminal of the rectifier 108 is connected to the terminal CFL of the trigger circuit T4 and the other terminal of the rectifier 109 is connected to the terminal CFL of the trigger circuit T1. These "and" circuits function exactly as the "and" circuits described in connection with Fig. 2, i. e., the juncture or common terminal of the two rectifiers of the "and" circuit will assume the most negative voltage present at the separately connected terminal of the rectifiers. Hence, the terminal Sg of the trigger circuit T2 will be positive only when the trigger circuit T1 is in the Left condition and the trigger circuit T4 is in the Right condition, the juncture 103 will be positive only when the juncture 99 is positive and the trigger circuit T2 is in the Left condition. The juncture 112 of the cathodes of the tube 84 will be positive (i. e., tube 84 more conductive) when either tube juncture 104 is positive or the juncture 110 is positive (i. e., cathode follower output tube CFO–D is in its most conductive state). In either case the output of the tube 84 is positive. Hence, the tube 84 functions as an "or" circuit. As used herein an "or" circuit refers to a circuit operable to produce a positive voltage when any one or more of the input terminals thereof has a positive voltage applied thereto. Description of the operation of the counter is undertaken conjointly in connection with Fig. 4 and Chart II below:

*Chart II*

| Circuit Point | | | | | Trigger Circuits | | | | | | | | Pulses to be Counted |
|---|---|---|---|---|---|---|---|---|---|---|---|---|---|
| OD | 112 | 104 | 103 | 99 | T4 | | T3 | | T2 | | T1 | | |
| — | — | — | — | — | | R | | R | | R | | R | 0 |
| — | — | — | — | + | | R | | R | | R | L | | 1 |
| — | — | — | — | — | | R | | R | L | | | R | 2 |
| — | — | — | + | + | | R | | R | L | | L | | 3 |
| — | — | — | — | — | | R | L | | | R | | R | 4 |
| — | — | — | — | + | | R | L | | | R | L | | 5 |
| — | — | — | — | — | | R | L | | L | | | R | 6 |
| — | + | + | + | + | | R | L | | L | | L | | 7 |
| — | — | — | — | — | L | | | R | | R | | R | 8 |
| + | + | — | — | — | L | | | R | | R | L | | 9 |
| — | — | — | — | — | | R | | R | | R | | R | 0 |

In the chart "R" indicates that the designated trigger circuit is in the Right condition at the times so indicated. Accordingly "L" indicates that the trigger circuit is in the Left condition. The designations OD, 112, 104, 103 and 99 refer to the similarly designated points in the circuit of Fig. 4. The + and — designations in the chart indicate respectively that the voltage at the designated point in the circuit of Fig. 4 is positive or negative as the case may be at the times specified.

In the initial or starting position with all trigger circuits in the Right condition all of the designated circuit points of Chart II will be in their most negative condition.

The first pulse from the source 61 switches the trigger circuit T1 to the Left condition. This switching of the trigger circuit T1 causes the voltage at the juncture 99 to become positive because the voltage at the terminal CFL of trigger T1 becomes positive and the voltage at the terminal CFR of the trigger circuit T4 remains positive. The voltage at the terminal *Sg* of the trigger circuit T2 is therefore positive and the trigger circuit is conditioned to be responsive to the next pulse applied thereto from the source 61.

The second pulse applied from the source 61 simultaneously switches the trigger circuits T1 and T2 to the Right and Left conditions respectively. This switching of the trigger circuit T1 to the Right condition causes the terminal CFL thereof to become negative and the "and" circuit comprising resistor 80 and rectifiers 97 and 98 commonly connected thereto at juncture 99 to become inoperative so that the juncture 99 assumes a negative voltage.

The third pulse applied from the source 61 switches the trigger circuit T1 to the Left condition. A positive voltage then appears at the terminal CFL of the trigger circuit T1 and in coincidence with the positive voltage present at the terminal CFR of the trigger circuit T4 causes a positive voltage to appear at the juncture 99 as previously described. This positive voltage at the juncture 99 in coincidence with the positive voltage at the terminal CFL of the trigger circuit T2 causes a positive voltage to appear at the juncture 103 as previously described. It is seen that a positive voltage is transferred from the juncture 103 to the terminal *Sg* of the trigger circuit T3 thereby conditioning the trigger circuit T3 to be responsive to the next pulse applied to its terminal *Cg* from the source 61.

The fourth pulse applied from the source 61 simultaneously switches the trigger circuits T1–T3 inclusive. The trigger circuits T1 and T2 are switched to the Right condition and the trigger circuit T3 is switched to the Left condition. As a result a negative voltage appears at the junctures 99 and 103.

The fifth pulse applied from the source 61 causes the trigger circuit T1 to switch from the Left condition and a positive voltage to again appear at the juncture 99.

The sixth pulse applied from the source 61 switches the trigger circuit T1 to the Right condition and the trigger circuit T2 to the Left condition. A negative voltage again exhibits itself at the junctures 99 and 103.

The seventh pulse applied from the source 61 switches the trigger circuit T1 to the Left condition. A positive voltage again appears at the juncture 99. Since the trigger circuits T2 and T3 are also in the Left condition a positive voltage also appears at the junctures 103 and 104. The positive voltage at the juncture 104 renders the right hand control grid of the tube 84, operated as an "or" circuit, positive so that the voltage at the point 112, representing the common connection of the cathodes of the tube 84, also becomes positive. A positive voltage is then impressed from the point 112 through the resistor 113 upon the terminal *Sg* of the trigger circuit T4 to condition trigger circuit T4 to be responsive to the next pulse applied from the source 61.

The eighth pulse applied from the source 61 switches the trigger circuits T1, T2 and T3 to the Right condition and the trigger circuit T4 to the Left condition. It should be noted that a positive voltage then appears at the terminal CFL of the trigger circuit T4 but that the point 110, at the control grid of the cathode follower output tube CFO–D remains negative because the trigger circuit T1 is in the Right condition. The voltage at the terminal CFL of the trigger circuit T1 is therefore negative and the "and" circuit comprising the rectifiers 108 and 109 and the resistor 94 remains inoperative. It is seen that the voltage at the junctures 99, 103 and 104 and at the point 112 becomes negative as a result of the eighth pulse.

The ninth pulse applied from the source 61 switches the trigger circuit T1 to the Left condition. The resulting positive voltage which appears at the terminal CFL of the trigger circuit T1 causes the "and" circuit comprising the rectifiers 108 and 109 and the resistor 94 to become operative and a positive voltage to be applied to the control grid of the tube CFO–D. As a result the cathode follower output tube CFO–D becomes more conductive and a positive output voltage appears at the terminal OD. Obviously this positive voltage may be employed to condition suitable carry circuits connected to a similar higher order counter so that the tenth input pulse will switch this counter and effect carry simultaneously. When the tube CFO–D becomes more conductive the increased voltage at its cathode causes a positive voltage to appear at the left hand control grid of the tube 84 which is operated as an "or" circuit. This positive voltage causes the tube 84 to become more conductive so that the point 112 again becomes positive to again condition the trigger circuit T4 to be responsive to the next pulse from the source 61.

The tenth pulse applied from the source 61 switches the trigger circuits T1 and T4 to the Right condition. Obviously for normal binary operation the trigger circuit T4 should remain in the Left condition. This switching of the trigger circuit T4 to the Right condition is made possible by the conditioning of the trigger circuit T4 by the "or" circuit comprising the tube 84 which is energized from the cathode follower output tube CFO–D which in turn is energized from trigger circuits T4 and T1. The trigger circuit T2 would normally be switched to the Left condition in response to the tenth input pulse. Such switching is not effected however, because the trigger circuit T4 is in the Left condition when the tenth pulse is received and the voltage at the terminal CFR is therefore negative. Hence, the juncture 99 remains negative.

Since the initial zero setting or stable condition of the counter may be determined by any conventional means as desired, it is obvious that the output pulse at the terminal OD will appear in response to each tenth pulse applied from the source 61 and that any desired number of pulses, ten or less than ten, may be required to produce the output during the first cycle of counter operation.

Other objects of the invention will be pointed out in the following description and claims and illustrated in the accompanying drawings, which disclose, by way of example, the principle of the invention and the best mode, which has been contemplated, of applying that principle.

Other embodiments of the invention employing the same or equivalent principle may be used and structural changes made as desired by those skilled in the art without departing from the present invention and within the spirit of the appended claims.

What is claimed is:

1. An electronic counter including a plurality of switching elements each having two conductive conditions and switchably responsive to pulses to be counted; a source of pulses to be counted; means connecting said source to each of said elements so that said pulses are applied simultaneously to all said elements; and circuit means connecting each of said elements, except one, to a different one of the remaining elements to render the latter responsive to said pulses in accordance with the conductive condition of the former whereby said elements rendered responsive to said pulses are simultaneously switched in response to the next subsequent pulse applied thereto from said source.

2. The counter set forth in claim 1 wherein said switching elements are free running multivibrators having a certain predetermined period and said source of pulse provides one pulse during each said period.

3. In an electronic counter including free running multivibrator counting elements that automatically switch from a first conductive condition to a second conductive condition, or vice versa the end of a certain preselected time; means for directly applying pulses to each of said elements simultaneously during said preselected time to effect a switching of predetermined elements; and coincidence circuit means responsive to simultaneous voltages interconnecting said elements for permitting switching in predetermined cyclic fashion.

4. A decade counter including a source of pulses to be counted; four inherently binary counting elements commonly connected to said source of pulses to be selectively energized; an output terminal energized when a certain voltage is present at a preselected point of each of two of said four counting elements; and electronic circuits consisting only of four "and" circuits and a single "or" circuit selectively interconnecting said four counting elements to control the selective energization thereof.

5. In a cyclically operable electronic circuit normally responsive to a preselected number of pulses during one cycle of operation and having first, second, third and fourth pulse counting elements each with two electrical conditions alternately assumed; a source of pulses; a connection from said source to each counting element so that each pulse transferred from said source is capable of switching each counting element from each electrical condition to the other; and a first coincidence circuit connected between said second counting element and said first and fourth counting elements respectively so that the simultaneous application thereto of preselected voltages from said first and fourth counting elements renders said circuit responsive to condition said second counting element to be switched in response to the next pulse applied thereto from said source.

6. In a cyclically operable electronic circuit normally responsive to a preselected number of pulses during one cycle of operation and having first, second, third and fourth pulse counting elements each with two electrical conditions alternately assumed; a source of pulses; a connection from said source to each counting element so that each pulse transferred from said source is capable of switching each counting element from each electrical condition to the other; and a first coincidence circuit connected between said second counting element and said first and fourth counting elements respectively so that the simultaneous application thereto of preselected voltages from said first and fourth counting elements renders said circuit responsive to condition said second counting element to be switched in response to the next pulse applied thereto from said source; and a second coincidence circuit connected between said third counting element and said first coincidence circuit and said second counting element respectively so that the simultaneous application thereto of preselected voltages from said first coincidence circuit and said second counting element renders said circuit responsive to condition said third counting element to be switched in response to the next pulse applied thereto from said source.

7. The circuit set forth in claim 6 including a third coincidence circuit connected to said second coincidence circuit and said third counting element and rendered responsive by the transfer of a preselected voltage thereto from the latter.

8. The circuit set forth in claim 7 including an output circuit connected to said first and fourth counting elements and responsive only when both said elements are in one preselected electrical condition.

9. The circuit set forth in claim 8 including a dual-input circuit having an output connection to said fourth counting element to condition the latter to be responsive to the next pulse from said source when the former is responsive, said dual-input circuit having input connections to said output circuit and to said third coincidence circuit and rendered responsive when a preselected voltage is transferred thereto from either of the latter circuits whereby the selective conditioning of said counting elements renders said circuit cyclically operable in response to a different number of pulses from said source.

10. A decade counter including, four counting elements each having two electrical conditions alternately assumed in response to pulses to be counted; a source of pulses to be counted; circuit means coupling each of said counting elements to said source so that each pulse present at said source is applied simultaneously to each of said counting elements; and coincidence circuit means selectively interconnecting said counting elements to condition said counting elements to be responsive to pulses from said source in a preselected fashion.

11. In a binary-decade counter; first, second, third and fourth electronic binary stages, each having two electrical conditions alternately assumed in response to pulses; a source of pulses connected to each of said binary stages; an output stage connected to be responsive only when said first and fourth binary stages are in one preselected electrical condition; and a first electronic "and" circuit connected between said second binary stage and said first and fourth binary stages to condition the former to be responsive to the next pulse applied from said source when each of the two latter stages is in one preselected electrical condition.

12. In the counter set fourth in claim 11; a second electronic "and" circuit connected between said second binary stage and said first "and" circuit and said second binary stage to condition the former to be responsive to the next pulse applied from said source; a third electronic "and" circuit connected to said second "and" circuit and said third binary stage to be responsive when said second "and" circuit and said third binary stage are in one chosen electrical condition; an "or" circuit connected to be energized by said third "and" circuit or said output stage; and a connection from said "or" circuit to said fourth binary stage to condition said stage to be responsive to pulses from said source when said "or" circuit is energized.

13. In a pulse responsive electronic circuit wherein the operational cycle of the circuit is determined by the electrical condition of a plurality of free-running multivibrators; a source of pulses and means for applying said pulses simultaneously to said free-running multivibrators; and circuit means including coincidence circuits interconnecting certain preselected free-running multivibrators so that the response of each free-running multivibrator to said pulses is determined by the electrical condition of a plurality of the remaining free-running multivibrators.

14. In the circuit set forth in claim 13 a switching circuit connected to be responsive to said circuit means and a selected one of said free-running multivibrators, respectively, to condition a different one of said free-running multivibrators to be responsive to pulses from said source.

References Cited in the file of this patent

UNITED STATES PATENTS

| | | |
|---|---|---|
| 2,536,808 | Higinbotham | Jan. 2, 1951 |
| 2,551,119 | Haddad et al. | May 1, 1951 |

FOREIGN PATENTS

| | | |
|---|---|---|
| 642,656 | Great Britain | Sept. 6, 1950 |